United States Patent
Trinh et al.

(10) Patent No.: US 8,573,326 B2
(45) Date of Patent: Nov. 5, 2013

(54) METHOD AND APPARATUS TO ADJUST WEIGHT-ON-BIT/TORQUE-ON-BIT SENSOR BIAS

(75) Inventors: Tu Tien Trinh, Houston, TX (US); Eric Sullivan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 267 days.

(21) Appl. No.: 13/085,222

(22) Filed: Apr. 12, 2011

(65) Prior Publication Data
US 2011/0272195 A1 Nov. 10, 2011

Related U.S. Application Data

(60) Provisional application No. 61/332,456, filed on May 7, 2010.

(51) Int. Cl.
*E21B 47/00* (2012.01)

(52) U.S. Cl.
USPC ............................................. 175/40; 175/45

(58) Field of Classification Search
USPC ...................... 175/40, 41, 45; 166/250.01, 66
See application file for complete search history.

(56) References Cited

U.S. PATENT DOCUMENTS

| | | | |
|---|---|---|---|
| 5,386,724 A | 2/1995 | Das et al. | |
| 6,142,250 A | 11/2000 | Griffin et al. | |
| 7,257,338 B2 * | 8/2007 | Yoshida | 399/49 |
| 7,283,166 B1 * | 10/2007 | Billman | 348/255 |
| 7,604,072 B2 | 10/2009 | Pastusek et al. | |
| 2007/0221417 A1 | 9/2007 | Hall et al. | |
| 2010/0038136 A1 * | 2/2010 | Trinh et al. | 175/40 |
| 2010/0307835 A1 | 12/2010 | Glasgow et al. | |
| 2010/0319992 A1 | 12/2010 | Trinh et al. | |

* cited by examiner

*Primary Examiner* — William P Neuder
(74) *Attorney, Agent, or Firm* — Cantor Colburn LLP (57) ABSTRACT

Apparatuses and methods for adjusting weight-on-bit/torque-on-bit sensor bias in a drill bit. The apparatus may include a bit adjustment device disposed at least partially in a cavity in a bit shank. The bit adjustment device includes electronics and sensors for estimating a weight-on-bit/torque-on-bit bias. The method includes adjusting the weight-on-bit/torque-on-bit sensor bias of a drill bit. The method may include adjusting force on a bit adjustment device to adjust weight-on-bit/torque-on-bit sensor bias. The method may also include securing the bit adjustment device within the cavity of the bit shank after the desired weight-on-bit/torque-on-bit sensor bias has been achieved.

14 Claims, 6 Drawing Sheets

METHOD AND APPARATUS TO ADJUST WEIGHT-ON-BIT/TORQUE-ON-BIT SENSOR BIAS

CROSS-REFERENCES TO RELATED APPLICATIONS

This application claims priority from U.S. Provisional Patent Application Ser. No. 61/332,456, filed on May 7, 2010 and incorporated herein by reference in its entirety.

FIELD OF THE DISCLOSURE

This disclosure generally relates generally to drilling methods and apparatuses and systems that utilize that same for drilling wellbores.

BACKGROUND OF THE DISCLOSURE

Oil wells (also referred to as "wellbores" or "boreholes") are drilled with a drill string that includes a tubular member having a drilling assembly (also referred to as the "bottomhole assembly" or "BHA"). The BHA typically includes devices and sensors that provide information relating to a variety of parameters relating to the drilling operations ("drilling parameters"), behavior of the BHA ("BHA parameters") and parameters relating to the formation surrounding the wellbore ("formation parameters"). A drill bit is attached to the bottom end of the BHA. The drill bit is rotated by rotating the drill string and/or by a drilling motor (also referred to as a "mud motor") in the BHA in order to disintegrate the rock formation to drill the wellbore. A large number of wellbores are drilled along contoured trajectories. For example, a single wellbore may include one or more vertical sections, deviated sections and horizontal sections through differing types of rock formations. When drilling progresses from a soft formation, such as sand, to a hard formation, such as shale, or vice-versa, the rate of penetration (ROP) of the drill changes and can cause (decreases or increases) excessive fluctuations or vibration (lateral or torsional) in the drill bit. The ROP is typically controlled by controlling the weight-on-bit (WOB) and rotational speed (revolutions per minute or "RPM") of the drill bit so as to control drill bit fluctuations. The WOB is controlled by controlling the hook load at the surface and the RPM is controlled by controlling the drill string rotation at the surface and/or by controlling the drilling motor speed in the BHA. Controlling the drill bit fluctuations and ROP by such methods requires the drilling system or operator to take actions at the surface. The impact of such surface actions on the drill bit fluctuations is not substantially immediate. It occurs a time period later, depending upon the wellbore depth.

SUMMARY OF THE DISCLOSURE

In aspects, the present disclosure is related to methods and apparatuses for adjusting weight on sensor bias on apparatus for drilling wellbores.

One embodiment according to the present disclosure may include an apparatus for adjusting sensor bias, comprising: a sensor body comprising: an upper portion configured to be operatively coupled with a bias adjustment device, a lower portion configured to be attached to a bit shank, and a sensing portion disposed between the lower portion and the upper portion, wherein the sensing portion includes at least one load cell, the load cell configured to indicate a magnitude of a force on the bit shank.

Another embodiment according to the present disclosure may include a method for adjusting sensor bias, comprising: selecting a force input to a sensor that causes the sensor to indicate a desired bias, the sensor disposed within a cavity in a bit shank and at least partially surrounded by a securing member, wherein the force input is one of a plurality of force inputs applied to the sensor by a bias adjustment device.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, the present disclosure is related to methods and apparatuses for adjusting weight on sensor bias on apparatus for drilling wellbores. In aspects, the present disclosure is particularly related to methods and apparatuses for adjusting weight on sensor bias on apparatus for drilling wellbores.

Figure 1:
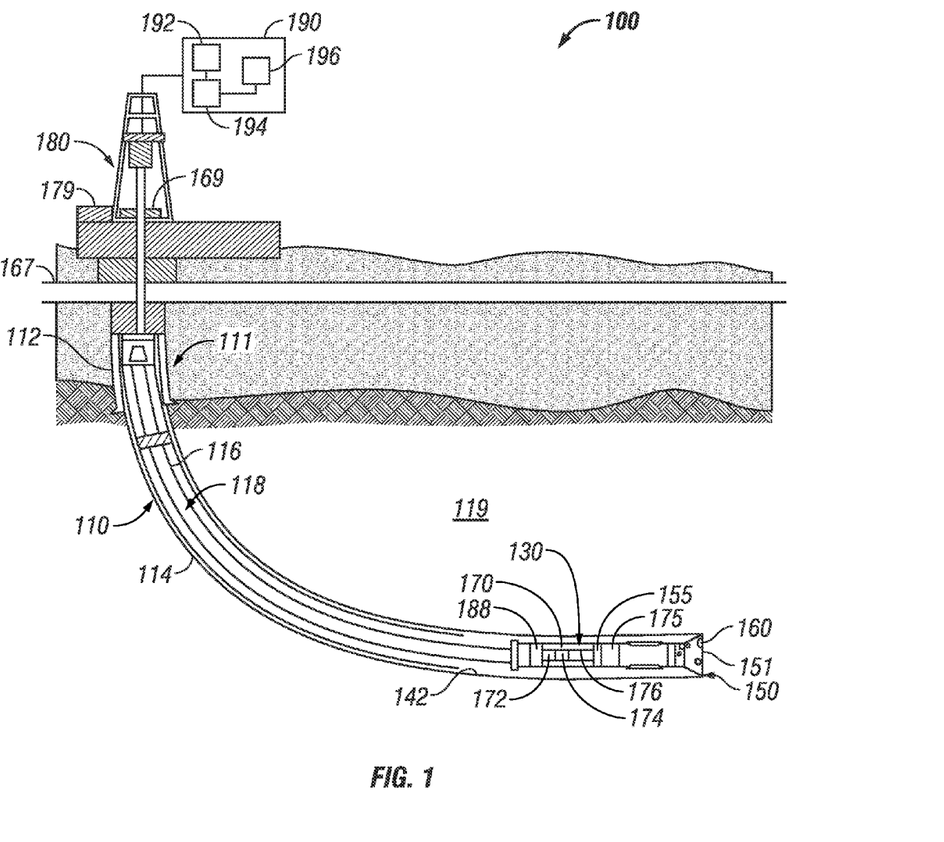
FIG. 1 shows a schematic of an exemplary drilling system that may utilize a drill bit made with the weight-on-bit/torque-on-bit bias adjusted according to one embodiment of the present disclosure.

FIG. 1 is a schematic diagram of an exemplary drilling system 100 that may utilize drill bits made according to the disclosure herein. FIG. 1 shows a wellbore 110 having an upper section 111 with a casing 112 installed therein and a lower section 114 being drilled with a drill string 118. The drill string 118 is shown to include a tubular member 116 with a bottomhole assembly (BHA) 130 attached at its bottom end. The tubular member 116 may be made up by joining drill pipe sections or it may be a coiled-tubing. A drill bit 150 is shown attached to the bottom end of the BHA 130 for disintegrating the rock formation 119 to drill the wellbore 110 of a selected diameter.

Drill string 118 is shown conveyed into the wellbore 110 from a rig 180 at the surface 167. The exemplary rig 180 shown is a land rig for ease of explanation. The apparatus and methods disclosed herein may also be utilized with an offshore rig used for drilling wellbores under water. A rotary table 169 or a top drive (not shown) coupled to the drill string 118 may be utilized to rotate the drill string 118 to rotate the BHA 130 and thus the drill bit 150 to drill the wellbore 110. A drilling motor 155 (also referred to as the "mud motor")

may be provided in the BHA 130 to rotate the drill bit 150. The drilling motor 155 may be used alone to rotate the drill bit 150 or to superimpose the rotation of the drill bit by the drill string 118. A control unit (or controller) 190, which may be a computer-based unit, may be placed at the surface 167 to receive and process information transmitted by the sensors in the drill bit 150 and the sensors in the BHA 130, and to control selected operations of the various devices and sensors in the BHA 130. Herein, the term "information" may relate to raw data, processed data, or signals. The surface controller 190, in one embodiment, may include a processor 192, an information storage device (or a computer-readable medium) 194 for storing information, algorithms and computer programs 196. The information storage device 194 may be any suitable device, including, but not limited to, a read-only memory (ROM), a random-access memory (RAM), a flash memory, a magnetic tape, a hard disk and an optical disk. During drilling, a drilling fluid 179 from a source thereof is pumped under pressure into the tubular member 116. The drilling fluid discharges at the bottom of the drill bit 150 and returns to the surface via the annular space (also referred as the "annulus") between the drill string 118 and the inside wall 142 of the wellbore 110.

Still referring to FIG. 1, the drill bit 150 includes a face section (or bottom section) 151. The face section 151, or a portion thereof, faces the formation in front of the drill bit or the wellbore bottom during drilling. The drill bit 150, in one aspect, includes one or more pads 160 at the face section 151 that may be adjustably (also referred to as "selectably" or "controllably") extended from the face section 151 during drilling. The pads 160 are also referred to herein as the "extensible pads," "extendable pads," or "adjustable pads." A suitable actuation device (or actuation unit) 155 in the BHA 130 and/or in the drill bit 150 may be utilized to activate the pads 160 during drilling of the wellbore 110. The BHA 130 may further include one or more downhole sensors (collectively designated by numeral 175). The sensors 175 may include any number and type of sensors, including, but not limited to, sensors generally known as the measurement-while-drilling (MWD) sensors or the logging-while-drilling (LWD) sensors, and sensors that provide information relating to the behavior of the BHA 130, such as drill bit rotation (revolutions per minute or "RPM"), tool face, pressure, vibration, whirl, bending, and stick-slip. The BHA 130 may further include a control unit (or controller) 170 configured to control the operation of the pads 160 and for at least partially processing information received from the sensors 175. The controller 170 may include, among other things, circuits to process the signals from sensors 175 (e.g., amplify and digitize the signals), a processor 172 (such as a microprocessor) to process the digitized signals, an information storage device 174 (such as a solid-state-memory), and a computer program 176. The processor 172 may process the digitized signals, control the operation of the pads 160, process information from other sensors downhole, control other downhole devices and sensors, and communicate information with the controller 190 via a two-way telemetry unit 188. In one aspect, the controller 170 may adjust the extension of the pads 160 to control the drill bit fluctuations or ROP to increase the drilling effectiveness and to extend the life of the drill bit 150. Increasing the pad extension may decrease the cutter exposure to the formation or the depth of cut of the cutter. Reducing cutter exposure may result in reducing fluctuations torsional or lateral, ROP, whirl, stick-slip, bending moment, vibration, etc., which in turn may result in drilling a smoother hole and reduced stress on the drill bit 150 and BHA 130, thereby extending the BHA and drill bit lives. For the same WOB and the RPM, the ROP is generally higher when drilling into a soft formation, such as sand, than when drilling into a hard formation, such as shale. Transitioning drilling from a soft formation to a hard formation may cause excessive lateral fluctuations because of the decrease in ROP while transitioning from a hard formation to a soft formation may cause excessive torsional fluctuations in the drill bit because of an increase in the ROP. Controlling the fluctuations of the drill bit, therefore, is desirable when transitioning from a soft formation to a hard formation or vice versa. The pad extension may be controlled based on one or more parameters, including, but not limited to, pressure, tool face, ROP, whirl, vibration, torque, bending moment, stick-slip and rock type. Automatically and selectively adjusting the pad extension enables the system 100 to control the torsional and lateral drill bit fluctuations, ROP and other physical drill bit and BHA parameters without altering the weight-on-bit or the drill bit RPM at the surface.

Figure 2:
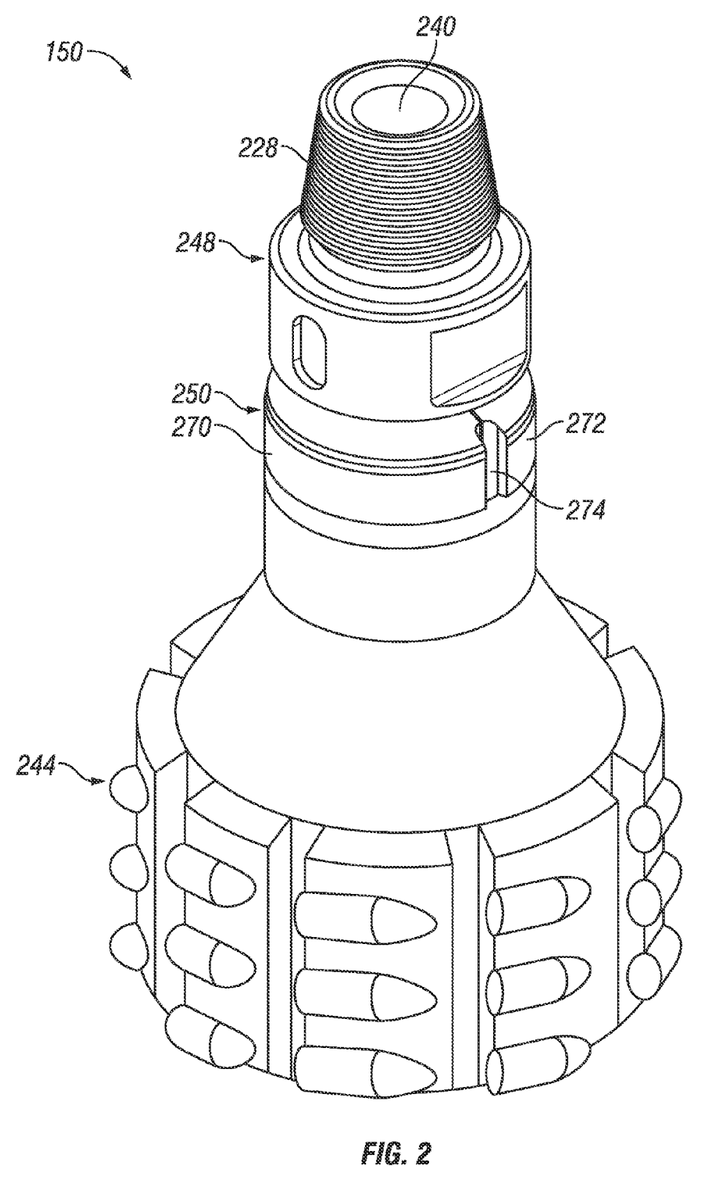
FIG. 2 shows a schematic close up of a drill bit according to one embodiment of the present disclosure.

An embodiment of an earth-boring rotary drill bit 150 of the present disclosure is shown in a perspective view in FIG. 2. Exemplary drill bit 150 is shown with a shank 248 secured to an optional extension 250 that may be secured directly to bit body 244. The shank 248 may include a threaded cap 228 for attachment to a drill string (not shown). The shank 248 also includes a longitudinal bore 240, which extends through the shank 248 and partially into the bit body 244.

As shown in FIG. 2, extension 250 may comprise two or more separate portions 270, 272 or members that may be assembled around the male connection portion (not shown) of the bit body 244 and secured together. A weld groove 274 may be provided along each interface between the two or more separate portions 270, 272 of the extension 250 to facilitate welding the two or more separate portions 270, 272 together along the weld grooves 274. In other words, the two separate portions 270, 272 of the extension 250 may be secured together around the male connection portion (not shown) of the bit body 244 by at least one weld (not shown) formed in each of the longitudinally extending weld grooves 274. In additional embodiments, the two separate portions 270, 272 may be secured together by one or more of a braze alloy, a swage, and mechanical fastening means in addition to or in place of the welds (not shown). In some embodiments, drill bit 150 may not have extension 250.

Figure 3:
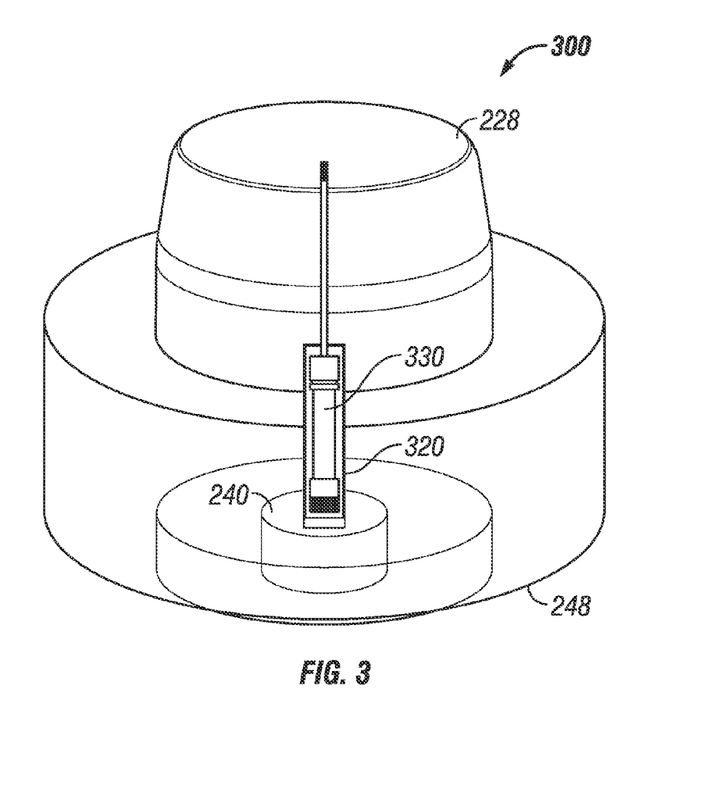
FIG. 3 shows a schematic of an exemplary bit shank with bit adjustment device according to one embodiment of the present disclosure.

A shown in FIG. 3, an apparatus 300 may be used to adjust the weight-on-bit/torque-on-bit sensor bias of a drill bit 150. The apparatus 300 includes the bit shank 248, which is shown with a cavity 320 dimensioned to accept a weight-on-bit/torque-on-bit adjustment device 330. In some embodiments, a cap 228 may be fitted above the shank 248 after the bias adjustment device (not shown) is removed.

Figure 4:
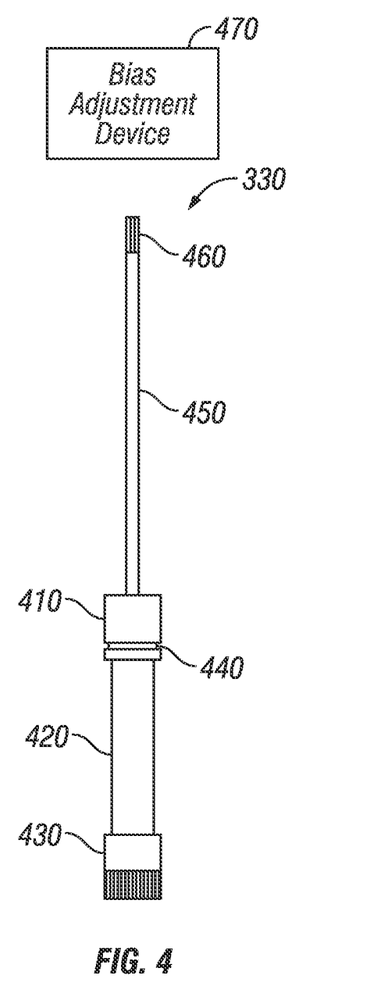
FIG. 4 shows a schematic of an exemplary bit adjustment device according to one embodiment of the present disclosure.

An exemplary bit adjustment device 330 is shown in FIG. 4. The bit adjustment device 330 may include an upper portion 410, a sensor portion 420, and a lower portion 430. Upper portion 410 may include an o-ring groove 440. Upper portion 410 may be operatively connected to a connecting rod 450, which is configured to be operatively connected to a temporary loading tool or bias adjustment device 470. In some embodiments, connecting rod 450 may include a threaded portion 460 for connecting to the bias adjustment device 470 or an alternative configuration for anchoring the connecting rod 450 to the bias adjustment device 470. The upper, sensor, and lower portions of the bit adjustment device 330 may be formed of an elastic material with a strain yield in excess of the maximum anticipated strain to be applied by a bias adjustment device 470 and a coefficient of thermal expansion similar to that of the bit shank 248. In some embodiments, part or all of lower portion 430 may be threaded, or otherwise configured to be anchored, to form a connection with bit shank 248 at the bottom of the cavity 320. In some embodiments, a curable medium, such as an epoxy, may be added to the cavity 320 for the purpose of securing the bit adjustment device 330. When a curable medium is used, an o-ring may be placed in the O-ring groove 440 to prevent travel of the curable medium from the bottom of the cavity 320 to the top of the upper portion 410. The use of an epoxy is exemplary and illustrative only, as other substances and devices may be used to secure the adjustment device 330 in the cavity 320, including, but not limited to, mechanical clamps and curable media responsive to electrical or electromagnetic energy. Sensor portion 420 may include force responsive sensors and associated electronics for estimating the amount of torque and/or compression/tension applied to the bit adjustment device 330 by the bias adjustment device. The force responsive sensors may include, but are not limited to, one or more of: (i) a piezoresistive strain gauge, and (ii) a deflective element. Sensor portion 420 may also include electronics, shown in FIG. 5, for determining the degree of bias adjustment received from the bias adjustment device 470.

Figure 5:
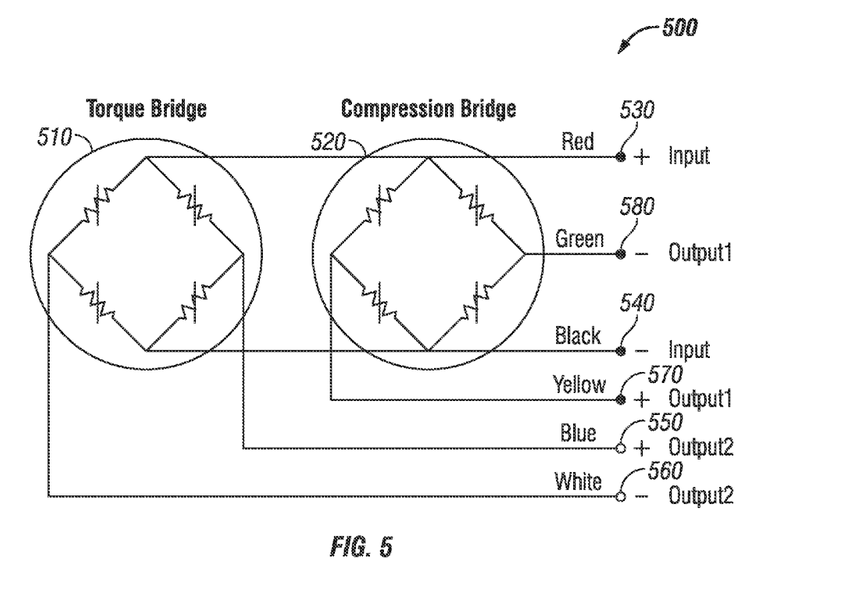
FIG. 5 shows an equivalent circuit diagram for an embodiment of the electronics for the bit adjustment device according to the present disclosure.

FIG. 5 shows a circuit diagram of the electronics 500 included in the sensor portion 420. In this exemplary embodiment, the electronics 500 include a torque bridge 510 and a compression bridge 520, each comprised of four resistive elements. In some embodiments, one of the resistive values of the resistive elements in the torque bridge 510 and the compression bridge 520 may be based on at least one force responsive sensor configured to indicate an amount of torque-on-bit torque bias and weight-on-bit compression/tension bias, respectively. The torque bridge 510 may be formed using a typical electrical bridge circuit design known to those of skill in the art and connected to a positive reference input 530 and a negative reference input 540 along a set of opposing corners of the bridge 510 and a positive signal output 550 and a negative signal output 560 along the remaining set of opposing corners of the torque bridge 510. In one embodiment, the torque bridge 510 is configured to be electrically balanced when the torque-on-bit bias is about zero. Similarly, The compression bridge 520 may be formed using a typical electrical bridge circuit design known to those of skill in the art and connected to a positive reference input 530 and a negative reference input 540 along opposing corners of the bridge 520 and a positive signal output 570 and a negative signal output 580 along the remaining set of opposing corners of the compression bridge 520. In one embodiment, the compression bridge 520 is configured to be electrically balanced when the weight-on-bit bias is about zero. The use of a bridge circuit is exemplary and illustrative only, as embodiments according to the present disclosure may be realized using a number of balancing circuits known to those of skill in the art. In some embodiments, the torque bridge and the compression bridge may use different sets of reference inputs. In some embodiments, the bridges 510, 520 may be used to adjust the weight-on-bit/torque-on-bit bias to a desired value other than about zero.

Figure 6:
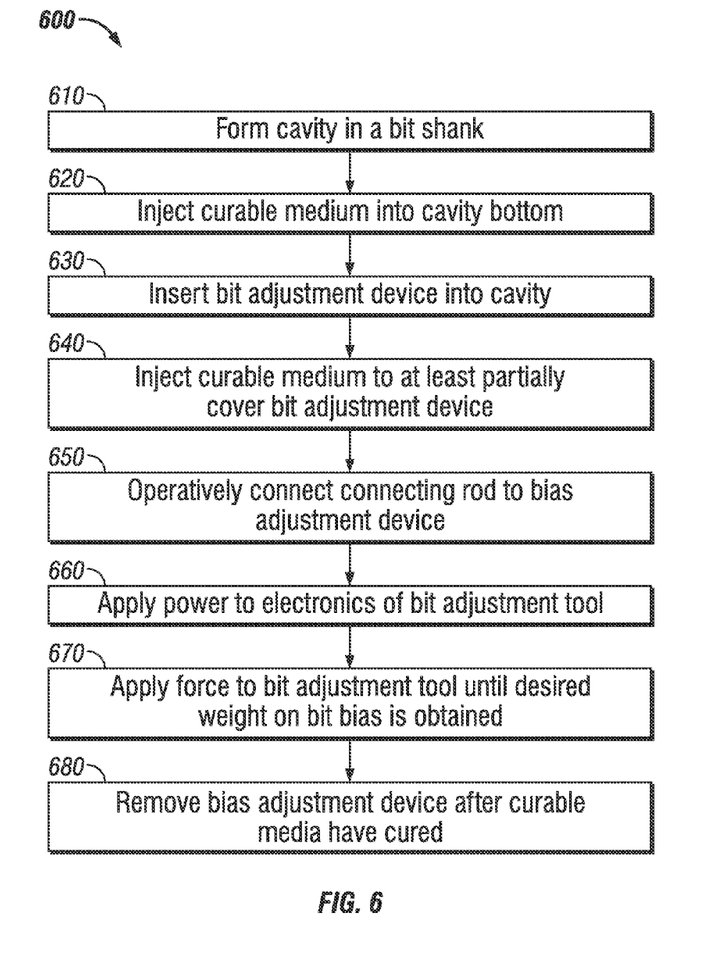
FIG. 6 shows a flow chart of a method for adjusting weight-on-bit/torque-on-bit sensor bias according to one embodiment of the present disclosure.

FIG. 6 shows an exemplary method 600 according to one embodiment of the present disclosure. In method 600, in step 610, a cavity 320 may be formed in bit shank 248 dimensioned to hold bit adjustment device 330. Then, in step 620, a curable medium may be injected into the bottom of the cavity 320. In step 630, bit adjustment device 330 may be inserted into the cavity 320. In step 640, a curable medium may be injected to at least partially cover the top of the bias adjustment device 330. In step 650, the connecting rod 450 is operatively connected to a bias adjustment device configured to apply to the connecting rod 450 one of: (i) torque, (ii) compression, and (iii) tension. In step 660, power may be applied to the electronics 500 of bit adjustment tool 330. In step 670, force is applied to the bit adjustment device 330 by the bias adjustment device (not shown) until the bridge output (torque bridge 510, compression bridge 520, or both as desired) reaches a desired value (often about zero). And, in step 680, the bias adjustment device may be removed after the curable media have cured, securing the bit adjustment device 330 within the bit shank 248. In some embodiments, step 610 may not be performed if bit shank 248 has a preformed cavity 320 sized to accommodate bit adjustment device 330. In some embodiments, the bit adjustment device 330 may be secured in cavity 320 by a mechanical stop or clamp, replacing the injection of a curable medium in one or both of steps 620 and 640. In some embodiments, the method may include the step of fitting a cap 228 on the bit shank 248 after the bias adjustment device (not shown) is removed.

While the foregoing disclosure is directed to the one mode embodiments of the disclosure, various modifications will be apparent to those skilled in the art. It is intended that all variations be embraced by the foregoing disclosure.

We claim:
1. An apparatus for adjusting sensor bias, comprising:
a sensor body comprising:
    an upper portion configured to be operatively coupled with a bias adjustment device,
    a lower portion configured to be attached to a bit shank, and
    a sensing portion disposed between the lower portion and the upper portion, wherein the sensing portion includes at least one load cell, the load cell configured to indicate a magnitude of a force on the bit shank.
2. The apparatus of claim 1, further comprising:
a rod, the rod having one end connected to the upper portion of the sensor body and the other end configured to be attached to the bias adjustment device.
3. The apparatus of claim 1, further comprising:
a securing member for securing the sensor body within the bit shank.
4. The apparatus of claim 3, wherein the securing member is least one of:
(i) a clamp, (ii) a curable medium, and (iii) an epoxy.
5. The apparatus of claim 1, wherein the force includes at least one of: (i) compression, (ii) tension, and (iii) torque.
6. A method for adjusting sensor bias, comprising:
disposing a sensor within a cavity in a bit shank;
operatively coupling a bias adjustment device to the sensor;
applying a plurality of force inputs to the sensor; and
selecting the force input of the plurality of force inputs where the sensor indicates a desired bias.
7. The method of claim 6, further comprising:
creating a cavity in a bit shank.
8. The method of claim 6, further comprising:
securing the sensor within the cavity with a securing member.
9. The method of claim 8, further comprising:
removing the bias adjustment device after the sensor has been secured.
10. The method of claim 8, using, for the securing member, at least one of:
(i) a clamp, (ii) a curable medium, and (iii) an epoxy.
11. The method of claim 6, wherein the sensor includes:
a sensor connecting rod and a sensor body.
12. The method of claim 6, using, for operative coupling of the bias adjustment device and the sensor, a connecting rod.

13. The method of claim 6, using, for the plurality of force inputs, at least one of: (i) compression, (ii) tension, and (iii) torque.

14. A method for adjusting sensor bias, comprising:
selecting a force input to a sensor that causes the sensor to indicate a desired bias, the sensor disposed within a cavity in a bit shank and at least partially surrounded by a securing member, wherein the force input is one of a plurality of force inputs applied to the sensor by a bias adjustment device.

* * * * *